US012169049B2

(12) United States Patent
Machýček et al.

(10) Patent No.: US 12,169,049 B2
(45) Date of Patent: Dec. 17, 2024

(54) KIT AND METHOD FOR A LAMP MODULE ASSEMBLY AND A SUPPORT ELEMENT

(71) Applicant: HELLA Autotechnik Nova s.r.o., Mohelnice (CZ)

(72) Inventors: David Machýček, Hlubočky (CZ); Marek Budiš, Mohelnice (CZ); Robert Fabián, Šumperk (CZ); Jiří Kubíček, Postřelmov (CZ); Tomas Tempir, Olomouc (CZ)

(73) Assignee: Hella Autotechnik Nova S.R.O., Mohelnice (CZ)

( * ) Notice: Subject to any disclaimer, the term of this patent is extended or adjusted under 35 U.S.C. 154(b) by 0 days.

(21) Appl. No.: 18/514,678

(22) Filed: Nov. 20, 2023

(65) Prior Publication Data

US 2024/0093848 A1 Mar. 21, 2024

Related U.S. Application Data

(63) Continuation of application No. PCT/CZ2021/050085, filed on Aug. 17, 2021.

(30) Foreign Application Priority Data

May 20, 2021 (CZ) ................................ CZ2021-239

(51) Int. Cl.
*F21S 41/19* (2018.01)
*F21S 41/141* (2018.01)
(Continued)

(52) U.S. Cl.
CPC ........... *F21S 41/192* (2018.01); *F21S 41/141* (2018.01); *F21S 41/198* (2018.01); *F21S 45/47* (2018.01);
(Continued)

(58) Field of Classification Search
CPC ........ F21S 41/192; F21S 41/198; F21S 45/49; F21S 41/29; F21S 41/55; F21S 41/141;
(Continued)

(56) References Cited

U.S. PATENT DOCUMENTS

| | | | | |
|---|---|---|---|---|
| 7,896,536 B2 * | 3/2011 | Arita | .................... | G02B 6/0088 362/633 |
| 11,255,518 B2 | 2/2022 | Suzuki | | |

(Continued)

FOREIGN PATENT DOCUMENTS

| | | |
|---|---|---|
| CN | 207316787 U | 5/2018 |
| CN | 211203922 U | 8/2020 |

(Continued)

OTHER PUBLICATIONS

International Search Report dated Jan. 18, 2022 in corresponding application PCT/CZ2021/050085.

*Primary Examiner* — Omar Rojas Cadima

(74) *Attorney, Agent, or Firm* — Muncy, Geissler, Olds & Lowe, P.C.

(57) ABSTRACT

A support element for a lamp module adapted to precisely accommodate at least one part of the lamp module that comprises an alignment member of the part, wherein the support element comprises at least one alignment member of the element, wherein the alignment member of the part forms, with the alignment member of the element, a pair of specially shaped complementary alignment members adapted to define the relative position of the support element and the given part by tightly fitting a protrusion on one member of the pair into a gap on the other member of the same pair. Furthermore, the object of the invention is a lamp module comprising the support element and a method of lamp module assembly on such a support element.

9 Claims, 7 Drawing Sheets

(51) Int. Cl.

| | |
|---|---|
| ***F21S 45/47*** | (2018.01) |
| ***F21S 45/49*** | (2018.01) |
| ***F21V 19/00*** | (2006.01) |
| *F21Y 115/10* | (2016.01) |

(52) U.S. Cl.
CPC ............ *F21S 45/49* (2018.01); *F21V 19/003* (2013.01); *F21Y 2115/10* (2016.08)

(58) Field of Classification Search
CPC ...... F21S 41/143; F21S 41/255; F21S 41/285; F21S 41/295; F21S 41/19; F21S 41/194; F21V 19/003; F21V 17/164; F21V 17/162; F21V 17/14; F16B 21/00; F16B 17/00; F21Y 2115/10
See application file for complete search history.

(56) References Cited

U.S. PATENT DOCUMENTS

| | | | |
|---|---|---|---|
| 11,435,048 | B2 | 9/2022 | Friesen et al. |
| 11,754,248 | B2 | 9/2023 | Bendix et al. |
| 2015/0285455 | A1 | 10/2015 | Sudahl |

FOREIGN PATENT DOCUMENTS

| | | | |
|---|---|---|---|
| DE | 202011108359 | U1 | 1/2012 |
| DE | 102014103379 | A1 | 9/2015 |
| DE | 102019129254 | A1 | 5/2021 |
| EP | 2402650 | A1 | 1/2012 |
| EP | 2693109 | A2 | 2/2014 |
| EP | 3726131 | A1 | 10/2020 |
| WO | WO2020182610 | A1 | 9/2020 |
| WO | WO2021103754 | A1 | 6/2021 |

* cited by examiner

KIT AND METHOD FOR A LAMP MODULE ASSEMBLY AND A SUPPORT ELEMENT

This nonprovisional application is a continuation of International Application No. PCT/CZ2021/050085, which was filed on Aug. 17, 2021, and which claims priority to Czech Patent Application No. PV 2021-239, which was filed in the Czech Republic on May 20, 2021, and which are both herein incorporated by reference.

BACKGROUND OF THE INVENTION

Field of the Invention

The present invention relates to modules for lamps, in particular automobile lamps. In particular, it relates to a support member for parts of the lamp module adapted to facilitate alignment of elements when assembling the lamp module. Furthermore, the invention relates to a kit for lamp module assembly and a method for lamp module assembly with such a support member.

Description of the Background Art

Lamp modules normally comprise a lens secured in a lens holder, a printed circuit board with LED light sources, and a heat sink, wherein other optical or light conducting members are often located between the lens and the light sources. For example, pressing or screwing is used to assemble these components together. Such a lamp module is known, for example, from the document CN207316787U U.

In the current state of the art, pins and complementary shaped openings are used to align the individual elements before they are screwed together. The pins on one part fit into the openings on the other part when the elements are put together, thus defining the relative position of the elements to a certain extent. The solution of a lamp module with such a method of assembly is described, for example, in the document CN211203922U U. Similar light module is described in document EP3726131 A1, which corresponds to US 2021/0071851, where conical pins are used for alignment of different parts of the module.

A disadvantage of the portions of the lamp module being put together by pins is that the precision of the putting together is affected by the precision of the pin and opening formation. In addition, different pairs of parts are connected by different pins and openings such that imprecisions in putting together the individual elements add up and the resulting lamp module can therefore be assembled together with relatively large imprecisions in the alignment of the individual parts.

Document DE102019129254 A1, which correspond to US 2022/0260225, which is incorporated herein by reference, and which describes a headlamp with lens securing elements designed as securing forks. These elements on the lens fit into recesses of a lens holder. An elastic force of such elements arranged on the lens perimeter then connects the lens to the lens holder.

In the conventional art, however, it is necessary to provided multiple elements and recesses on connected parts in order to secure them together, and the precision of the connection might be worsened by any imprecisions on the securing elements or the recesses.

It would therefore be useful to provide solution that would allow easy and precise lamp module assembly.

SUMMARY OF THE INVENTION

The shortcomings of the solutions known in the prior art are to some extent eliminated by a support element for a lamp module adapted to precisely accommodate at least a first part of the lamp module. The first part of the lamp module, which the support element is adapted to accommodate, comprises at least one alignment member of the part and the support element comprises at least one alignment member of the element, wherein the alignment member of the part forms with the alignment member of the element a pair of complementary alignment members adapted to define a relative position of at least the support element and the first part of the lamp module. One member of each pair of the complementary alignment members comprises a protrusion and the other member of the same pair comprises a gap with a shape complementary to the shape of the protrusion defined by at least one wall. For example, the one wall may define a cylindrical gap, but also a more complex shape of the gap may be considered to be defined by a single wall if the radii defining such a shape are large enough such that they do not form edges dividing the wall into multiple walls. By default, however, the gap is defined by multiple walls.

The protrusion is adapted to be seated on at least one wall of the gap, wherein it may or may not be seated on more of its walls if the gap is defined by multiple walls, wherein this seating occurs via at least one pair of points lying on two opposite surfaces of the protrusion. These opposite walls may be parallel to each other, but may also be inclined with respect to each other, for example by 45° or 30°, etc., preferably less than 60°, they may share an edge, or may have another wall or empty space between them. A portion or portions of the protrusion located between these two points is then clamped in the gap and this clamping ensures the relative position of the two members in the pair and thus also the relative position of the support element and the first part of the module. The protrusion comprises two ends, wherein the first end secures it to the support element or the first part of the module, depending on which one of these components the protrusion comprising the alignment member is located, and the second end is free and adapted to be inserted into the gap. The other end is therefore normally offset from the surface of the given component from which the protrusion protrudes. The gap-defining alignment member also comprises two ends, wherein the first end is firmly connected to the support element or first part of the module and the second end defines the entrance to the gap for the protrusion. This gap-defining alignment member may protrude from the surface, similarly to the protrusion of the second member, but may also be partially or completely embedded in the given component. The protrusion on one alignment member of each pair narrows in the direction from its first end to the second and/or the gap on the second member of the same pair widens in the direction from its first end to the second end.

This narrowing of the protrusion, widening of the gap, or a combination of both ensures that when the protrusion is inserted into the gap, the protrusion is seated tightly on the gap walls (at least at two offset points, but preferably at multiple pairs of points). As a result, potential manufacturing imprecision does not prevent a tight and exact seating, as is the case of securing pins in openings used in the prior art. In other words, in the direction from the first end to the second end, the cross-sectional area may be reduced by at least one member of the pair of the complementary alignment members, where the cross-section is for example perpendicular to the connecting line of the first end with the second end, which may be e.g., the axis of the protrusion. By default, this connecting line is vertical in the normal assembly position of the support element and the module parts.

Thus, for example, the surfaces of the protrusion on which said points of the pair of points of contact between the protrusion and the gap are located approach each other; towards the second end of the protrusion, and/or, on the contrary, the corresponding walls or parts of the wall of the gap move further away from each other towards the second end of the gap-defining alignment member.

Preferably, at least one, more preferably each, pair of the complementary elements is arranged in such a way that the two elements are mutually centered when the protrusion is inserted into the gap, or when the gap is mounted on the protrusion. Thus, the center of the protrusion is pushed to the center of the gap or, on the contrary, the center of the gap is pushed to the center of the protrusion, i.e., the centers of these elements are mutually aligned. This centering can be provided, for example, by the shape of these elements. In particular, the protrusion may comprise a set of arms comprising at least one arm, and the gap comprises a corresponding number of slots forming a portion of the gap adapted to secure one arm. Preferably, the slots are located on the perimeter of the gap. When inserting the protrusion into the gap, each arm is inserted into the corresponding slot, which clamps the arm and, in case when multiple arms are used, additionally pushes the intersection of the arms into the center of the gap. Each arm then contains said pair of points in which the protrusion is seated on the gap with the thickness of the arm defined, at least in that place, by the distance of the points of the pair.

It is obvious that the elements are not normally seated at isolated points but at least in curves of a certain length or in areas with a certain content. Each point of the pair can then be included in a different curve/area such that, for example, the protrusion is then seated on the walls of the gap in two areas located on mutually opposite surfaces of the protrusion.

Preferably the protrusion of the given member from at least one pair of the complementary alignment members, i.e., that member which comprises the protrusion, is adapted to be seated on at least one wall of the gap in three pairs of points, wherein one point from each pair lies on the protrusion surface opposite to the surface on which the other point from the same pair lies. As noted above, these points may be part of larger units. The clamping of the protrusion, e.g., the arms on the protrusion, in the gap thus occurs in at least three places, thus ensuring the exact position of the protrusion in the gap, i.e., the relative position of the two alignment members of the pair of the complementary alignment members.

Preferably, these pairs of points are offset from each other such that the protrusion is seated in sufficiently distant places to ensure stability. For example, these pairs can be mutually rotated around the axis of the protrusion by at least 30°, wherein they are offset from this axis, e.g., by at least a millimeter or at least two millimeters.

In the case where the protrusions are provided with arms, the protrusion comprises at least three arms and the gap comprises at least three slots for clamping the arms. The widening of the protrusion and/or narrowing of the gap can then be provided by increasing the thickness of the arms and/or reducing the width of the slots. Preferably the arms intersect at the center of the protrusion, in case of a single arm, this arm preferably passes through the center of the protrusion.

Preferably, all pairs of the complementary alignment members comprise together at least six said different and mutually offset pairs of points at which the protrusion is seated on the gap wall. Thus, if there are three such pairs on a single protrusion, the support element with the first part of the module, which the support element is adapted to accommodate, comprises at least two pairs of complementary alignment members. If the protrusion comprises only two pairs of these points, then at least three pairs of complementary alignment members are preferably available.

The gap-defining member of the at least one pair of the complementary alignment members may be composed of a portion protruding from the surface of the support element or the first part of the module, wherein the protruding portion defines the given gap. This protruding portion therefore allows the protrusion to be captured in the gap without the protrusion having to extend all the way under the surface of the component carrying the gap-defining member. The protrusion can therefore be shorter and less prone to damage. The gap can be defined by a single protruding portion or by a group of multiple protruding portions. Preferably, the gap is defined by multiple protruding portions that narrow in the direction towards the other end, thereby widening the gap or at least a portion of the gap. For example, the slots for attachment of the arms may be defined between each pair of such protruding portions such that each point of the pair of points of seating of the protrusion on the walls of the gap may be in contact with another protruding portion. In such a case, the gap is already defined by multiple walls, at least one wall for each protruding portion.

Furthermore, the support element is preferably adapted to precisely accommodate the second part of the lamp module, wherein the second part of the module comprises at least one through opening, wherein the at least one alignment member of the element is adapted to pass through the opening. The first as well as the second part of the module may be selected from a set comprising in particular a lens holder, a light source, and a primary optical member, which are the most common parts of lamp modules. Another part may be the lamp housing, but usually the lens holder acts as the housing. The terms first and second part of the lamp merely distinguish these parts from each other, wherein the first part comprises alignment members complementary to those on the support element, while the second part comprises through openings that are also formed complementary to the alignment members but do not form said pairs of complementary members with them, since a plurality of parts with through openings can be mounted on a single alignment member. At the same time, the support element may carry a plurality of first and/or second parts, but preferably the first part of the module is only one.

Thus, the support element of the invention can define a position for several parts by means of single alignment members. As a result, the resulting lamp module is put together more precisely than when pairs of module components are mutually put together on their own alignment members different from those for the other pairs of components.

The shortcomings of the known solutions are further at least partially eliminated by a kit for a lamp module assembly comprising a first part of the module selected from a set comprising a lens holder, a light source, and a primary optical member, wherein the kit further comprises the support element described above. The set from which the first part is selected may further comprise, for example, a lens or a housing or a cover for the module.

The first part of the module may be a lens holder, wherein the kit may further comprise a light source, which is the second part of the module comprising at least one opening for the alignment member on the support element to pass through. The kit for the lamp module assembly may then further comprise a primary optical member, which is a further second part of the module comprising at least one opening for the alignment member on the support element to pass through. Another component of the kit may be, for example, a lens, a heat sink for the light source, a power source or power supply, etc. Some components do not need to be fit in place by alignment members, especially components whose exact position does not matter much, such as the power supply.

The kit for lamp module assembly may be adapted for removing parts of the module from the support element after they have been firmly connected. In such case, the support element serves for defining the relative position of several parts of the module and, after the parts have been connected to form the module, the module can be removed from the support element and, for example, incorporated into the lamp. The support element can then be used for assembling other modules. The firm connection of parts can be provided, for example, as a screw connection, pressing, gluing, welding, riveting, etc.

This adaptation of the kit can be implemented, for example, in such a way that the screws do not pass through the support element during connection, or that there is no glue applied on the support element, etc. It is also possible to have an example in which the screws pass through the support element but pass through openings larger than the screw heads such that the support element is not secured by the screws in any way. Since the parts of the module are preferably placed on top of each other in the vertical direction, i.e., one on top of the other with the support element underneath, the screwing is preferably done from the bottom such that the screw passes through each part. The support element can therefore be provided with through openings for the tightening tool, which ensure easy assembly of the module on the support element.

However, the kit for lamp module assembly may also be adapted for attaching the parts of the module to the support element when they are being firmly connected. The support element is then firmly connected with the resulting module, for example, it can serve as an outer cover for the module, or form this cover together with the lens holder, it can serve for fixing the module to the light, etc.

The shortcomings of the known solutions are furthermore to a certain extent solved by a method for lamp module assembly performed on the support element of the present invention. This method comprises the following steps:

- Provision of the first part of the module;
- Accommodation of the first part of the module on the support element. After this accommodation, the protrusion comprising an alignment member from that at least one pair of the complementary alignment members extends into the gap of the second member of the same pair and is seated on at least one wall thereof; and
- Firm connection of the first part of the module to at least one other part of the module and/or to the support element.

Obviously, if the support element is not firmly connected to the first part of the module after the method is performed, the module comprises at least one other part to which the first part can be connected after alignment on the support element. If the support element is firmly connected to the module, the method can be performed with only the support element and the first part of the module; preferably, however, the resulting module comprises multiple parts.

This method can also be performed on the kit of the invention.

The method for the lamp module assembly may thus before the step of firm connection include a step of

- provision of at least one second part of the module comprising at least one opening for the alignment member on the support element to pass through. However, preferably it comprises at least two openings to define a more exact position.

Between the step of accommodation of the first part and the step of firm connection, and, as is obvious, also after the step of provision of at least one second part, this method further comprises the step of

- accommodation of the at least one second part on the support element with the first part of the module accommodated. After this accommodation, at least one alignment member of the at least one pair of the complementary alignment members passes through the opening of the at least one other part of the module.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
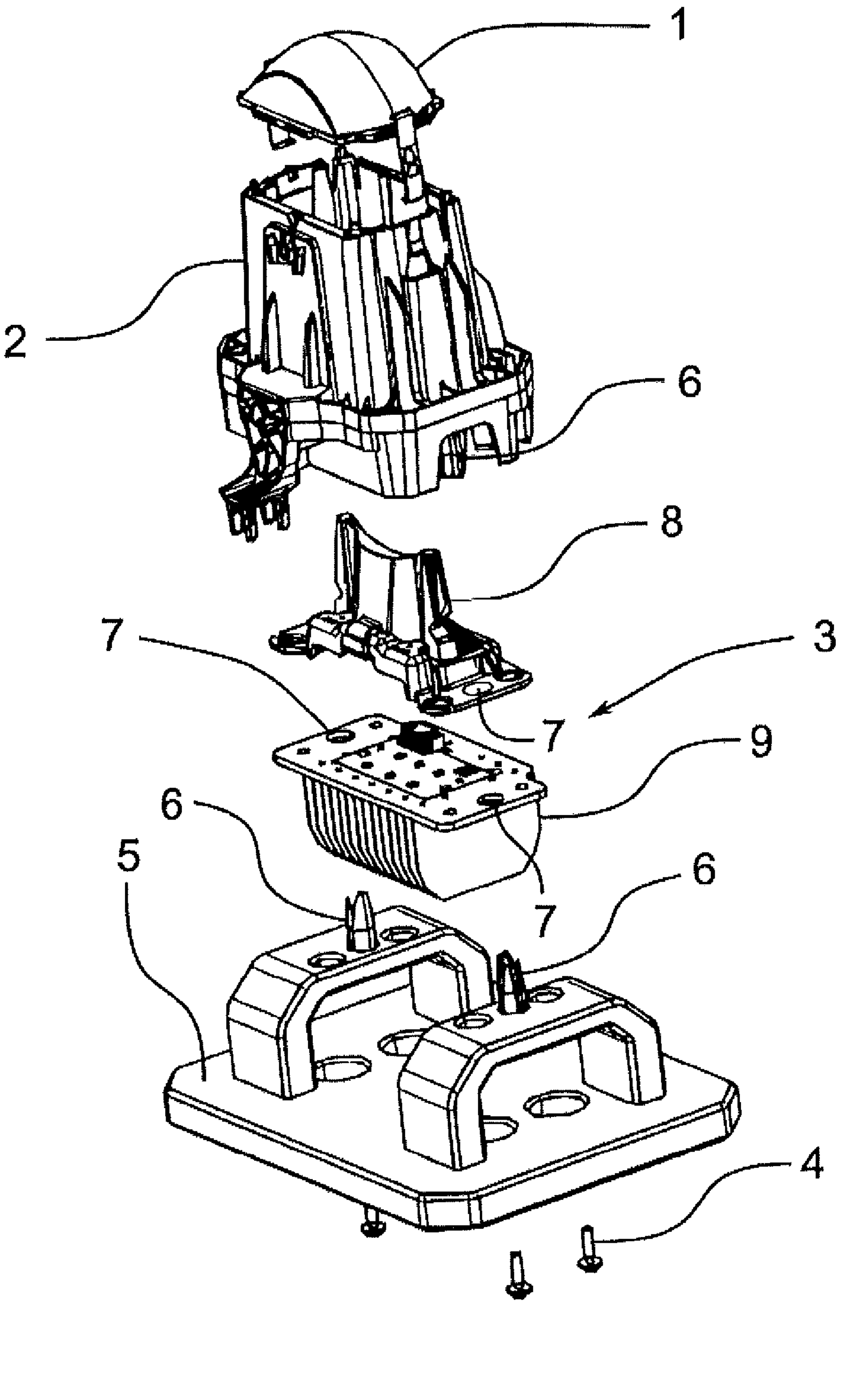
FIG. 1 shows schematically an exploded view of the kit for lamp module assembly of the present invention.

An object of the present invention is a kit for lamp module assembly. In the example in the exploded view in FIG. 1 and in assembled state in FIG. 2, this kit comprises parts of the lamp module, which are a lens 1, a lens holder 2, a light source 3, a primary optical member 8, and connecting members 4, here four screws. The lens holder 2 is here a first part of the module that comprises alignment members 6 complementary to the members of the support element 5, as will be more fully described below, while the light source 3 and the primary optical member 8 are second parts of the module that comprise openings 7, the form and function of which will also be more fully described below. The light source 3 comprises a heat sink 9 with aluminum fins and a printed circuit board with an LED chip attached to the heat sink 9. Furthermore, the kit comprises a support element 5, which serves substantially as a stand for the module assembly, which precisely defines the relative position of the parts of the module such that these parts fit exactly on each other and any imprecisions in the dimensions of some of the parts are as little noticeable on the resulting module as possible, i.e., in particular such that the imprecision does not add up.

Figure 2:
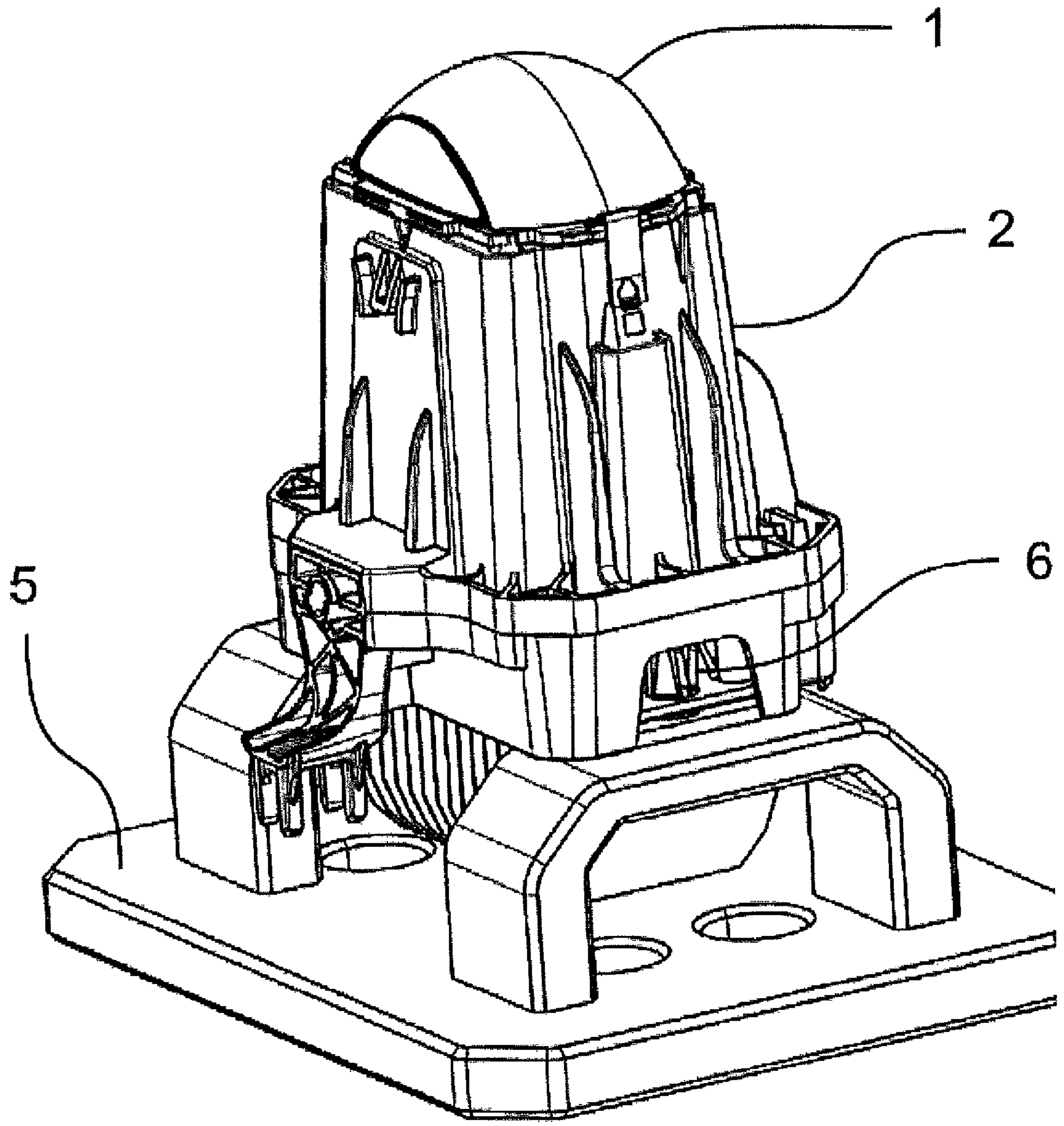
FIG. 2 shows schematically a view of the kit of FIG. 1 in the assembled state, wherein the resulting module is fit in the support element, which is here a part of the kit but not a part of the module.

In the shown example, the lens holder 2 is made of a non-translucent plastic and substantially serves as a frame or housing for the rest of the module. The lens holder 2 is hollow, in the example it is approximately shaped like a cuboid or a truncated tetrahedral pyramid, wherein this shape has both bases open, the lens 1 is attached to it from above, and the other parts of the module are placed in it from below. In the resulting lamp module, as shown in FIG. 2, only the heat sink 9 protrudes from the lens holder 2 on the underside, the rest of the light source 3 and the primary optical member 8 are hidden inside the lens holder 2. The lens 1 is made of a transparent material, e.g., glass, polycarbonate, etc., and is secured on the lens holder 2 by metal plate grips. However, the lens 1 can be also screwed, glued, pressed, etc.

The primary optical member 8 is also made, at least in part, of a translucent material and serves for adjusting the light from the light source 3, i.e., it affects the shape of the light cone emerging from the module. The LED chip on the light source 3 comprises multiple LEDs, and in alternative examples, it may comprise a single LED or may comprise a light source based on other technology. There is also an energy source (not shown) connected to the light source 3. The primary optical member 8 as well as the light source 3 comprise a pair of through openings 7. These openings 7 have all the same size, and in the assembled state of the module, the openings 7 on the light source 3 are aligned with the openings 7 in the primary optical member 8, or in other words, when the openings 7 on the two parts are aligned, the parts are correctly aligned for assembly. It is also possible to mount the openings 7 on the light source 3 on alignment members 6 other than the openings 7 on the primary optical member 8. However, from the point of view of the mutual alignment of the parts, it is preferred if the corresponding openings 7 on the different parts are fitted on common alignment members 6, which will be described in detail below. The openings 7 on the light source 3 may pass through, for example, a printed circuit board of the light source 3, or they may pass through the heat sink 9, e.g. a surface of the heat sink 9 to which a printed circuit board is attached, as in the example shown in FIG. 1, and or the heat sink 9 may comprise additional surfaces or protrusions for the openings 7.

In the shown example, the support element 5 takes the form of an approximately rectangular plate from which two U-shaped handles protrude upwards. Between these handles, a space is defined for the heat sink 9 when the light source 3 is placed on the support element 5. At the same time, a pair of openings is formed in each handle for screws, and under these openings, larger, coaxial openings are formed in the plate. A tightening tool for the connecting members 7 can be inserted through the openings in the plate from below during assembly, wherein the openings in the handles are larger than the diameter of the head of the connecting members 7 such that the support element 5 is not attached to the module in the present kit for lamp module assembly after being screwed together. Once the module is assembled, the module can be removed from the support member 5, which can then be used for assembling other lamp modules. In examples without the heat sink 9 or with a smaller or differently shaped heat sink 9, the support element 5 may be provided without handles, for example only as a plate with alignment members 6, which will be described in more detail below.

Figure 3:
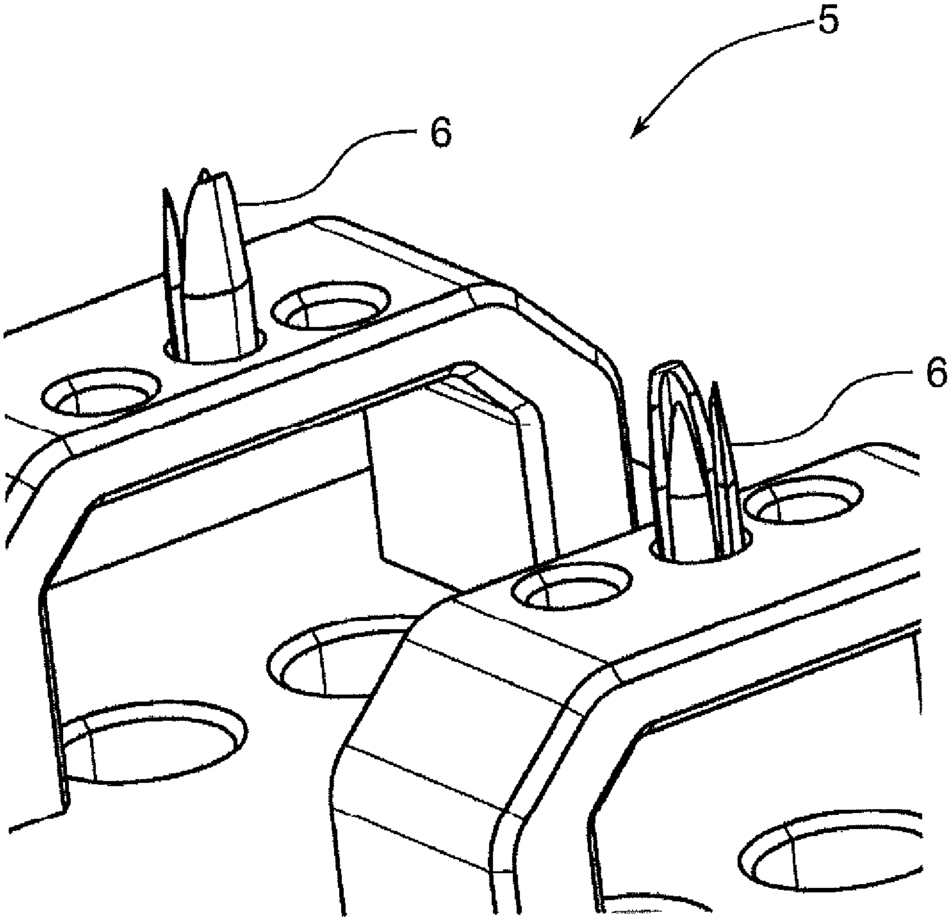
FIG. 3 is a detailed view of the alignment members on the support element.
Figure 4:
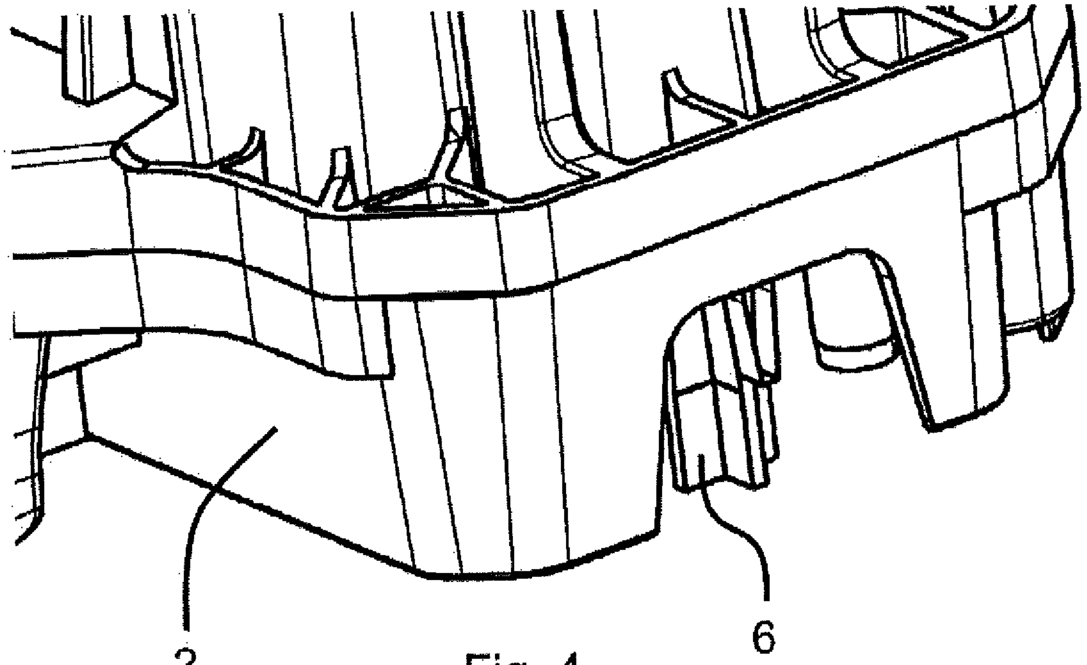
FIG. 4 is a detailed view of the alignment member on the lens holder.

The precise definition of the exact relative position of the parts of the kit according to the invention is ensured by means of pairs of complementary alignment members 6. In the shown example, the kit comprises two such pairs, wherein each pair comprises an alignment member 6 in form of a protrusion having a T-shaped cross-section (T-protrusion) (see FIG. 4) fixed to the lens holder 2 and an alignment member 6 in form of a protruding portion defining a gap adapted to secure the protrusion having a T-shaped cross-section (see FIG. 3). In the shown example, the gap-defining aligning members 6 take the form of a cylindrical surface that is firmly connected to the handles of the support element 5 at a first end, and at a second, free end, three cut-outs are formed therein, narrowing in the direction towards the first end. These cut-outs are mutually rotated by 90° or 180° relative to the axis of this alignment member such that one arm of the protrusion having a T-shaped cross-section on the other alignment member 6 of the pair can fit into each cut-out. Due to the narrowing shape of the cut-out, the arms of the T-protrusion are clamped when one alignment member 6 is inserted into the other (see detail in FIG. 5) and at the same time this shape pushes the center of the T-protrusion into the center of the gap during the insertion, whereby the lens holder 2 is precisely aligned in a correct and exact position relative to the support element 5 when placed on the support element 5. The gap therefore has the largest cross-sectional area at the point of entry into the gap and then gradually narrows. At the same time, the distance of the alignment members 6 on the support element 5 is the same as the distance of the openings 7 on the light source 3, the distance of the openings 7 on the primary optical member 8, and, as can be seen from the above, the distance of the alignment members 6 on the lens holder 2 as well.

Figure 5:
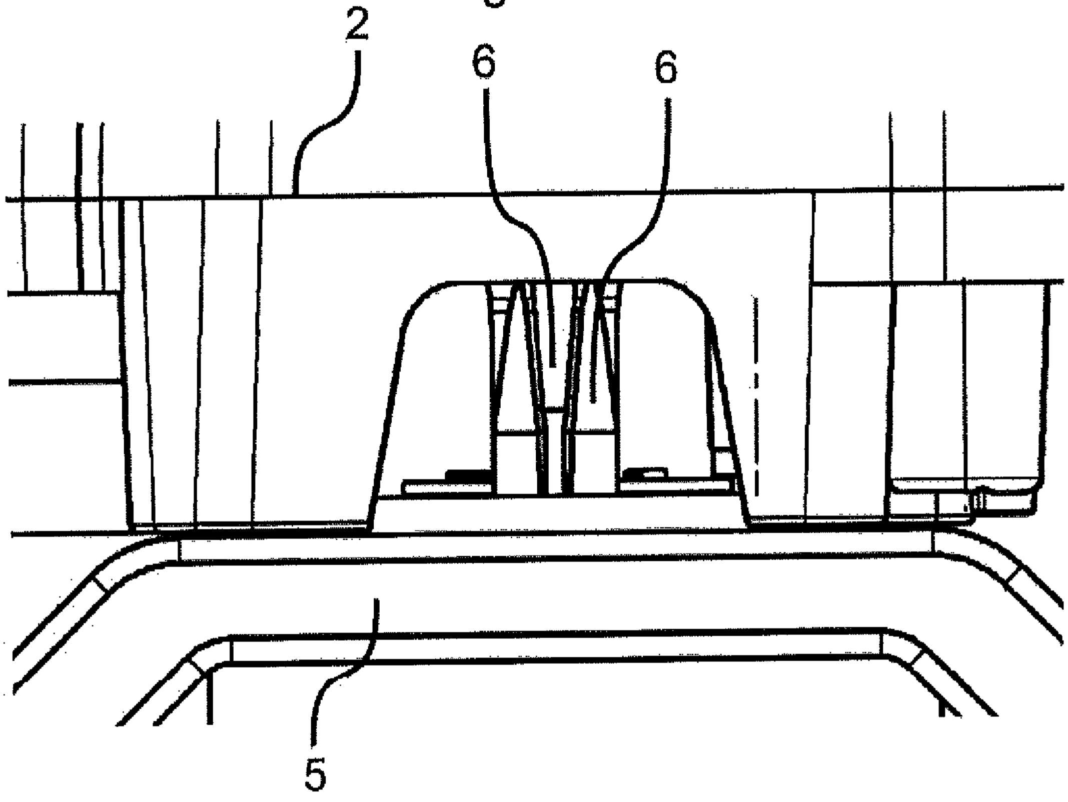
FIG. 5 is a detailed view of a pair of complementary alignment members on the assembled module fit in the support element.

FIG. 5 shows one arm of the T-protrusion secured between two mutually approaching walls of the cut-out in the alignment member 6 on the support element 5. As can be seen in this figure, the arm of the T-protrusion narrows downwards, i.e., towards the free end of the T-protrusion. The thickness of the arms of the T-protrusion may be constant throughout the height of the T-protrusion, as the corresponding cut-outs narrow to allow the arms to fit and be clamped firmly. An example where some arms narrow and others do not is also possible, in which case all cut-outs on the second alignment member 6 may narrow accordingly or the cut-outs corresponding to the narrowing arms may have a constant width.

During the assembly, which will be described in more detail in the method of the invention below, a light source 3 is mounted on the support element 5, wherein the alignment members 6 of the support element 5 pass through the openings 7 of the light source 3. The size of the openings 7 is chosen such that the alignment members 6 precisely pass through the openings 7 and define the position of the light source 3. Subsequently, the primary optical member 8 is mounted on the support element 5 with the light source 3, through the openings 7 of which pass the alignment members 6 of the support element 5 in a similar manner to the light source 3. Subsequently, the lens holder 2 is placed on the support element 5 with the light source 3 and the primary optical member 8, wherein its alignment members 6 with the T-protrusions pass through a gap defined by the walls of the alignment members 6 of the support element 5 as far as is permitted by the narrowing cut-outs forming these gaps. In some examples, the T-protrusion may also pass through the openings 7 of the light source 3 and/or the primary optical member 8. Subsequently, the light source 2, the primary optical member 8, and the lens holder 2 are firmly connected, in the shown example by screws, but it is possible to use, for example, rivets, pressing, gluing, welding together, or any other method of connection. The fixation of the lens 1 to the lens holder 2 may be performed before, after, and during the above-described putting together.

The kit of the invention may also comprise any other number of pairs of complementary alignment members 6, for example only one, or even more than two, for example four or eight. The number of openings 7 in the light source 3 and in the primary optical member 8 may then be equal to or less than the number of pairs such that there may be pairs of complementary alignment members 6 in the kit in which no member passes through the opening 7. The gap-defining alignment member 6 may be provided not as a protruding portion as in FIG. 3 but as a recessed portion, i.e., for example as a cylindrical opening in the support element 5, wherein the perimeter of this cylindrical opening further contains cut-outs recessed in the wall that narrow in the direction towards the bottom of the opening to secure the arms of the T-protrusion. In such an example, it may be preferable to create longer T-protrusions such that the T-protrusions extend into these cylindrical openings.

Figure 8:
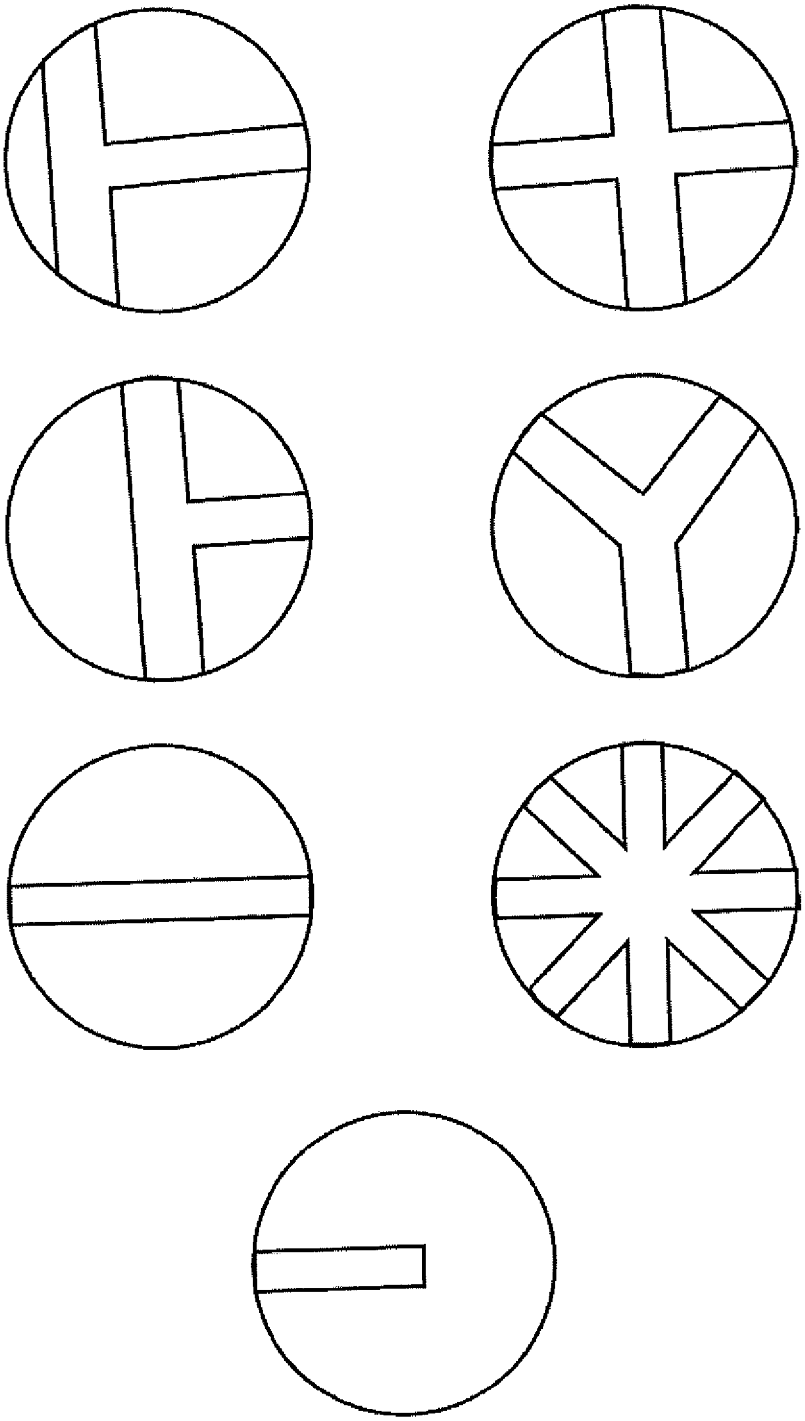
FIG. 8 shows schematically several cross-sections through the alignment members with different forms of protrusions.
Figure 9:
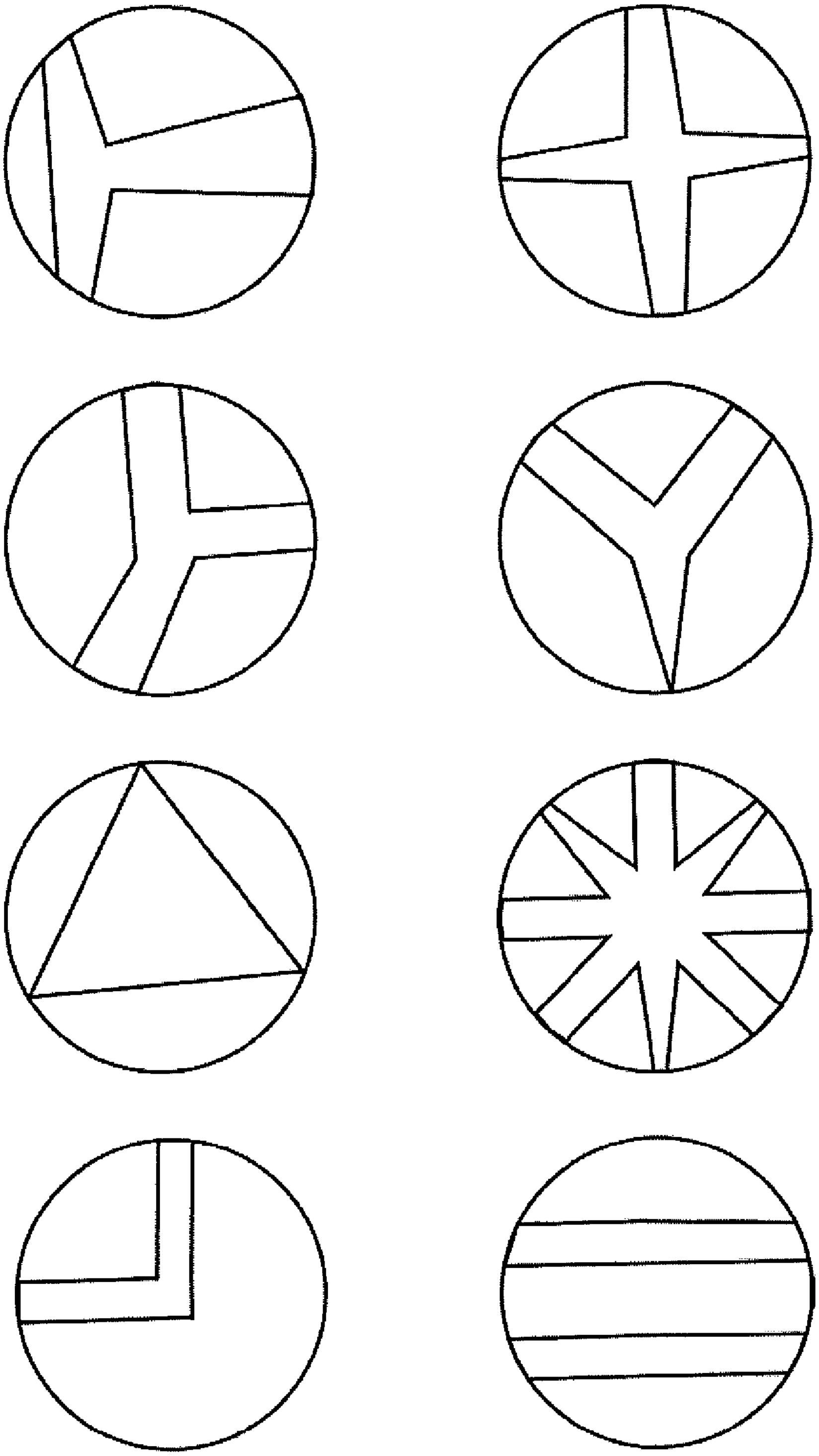
FIG. 9 is a schematic drawing of a number of other possible cross-sections through the alignment members with different forms of protrusions.

It is possible to provide the alignment members 6 on the lens holder 2 not as T-protrusions, but for example as X-protrusions, Y-protrusions, V-protrusions, I-protrusions, H-protrusions, K-protrusions, *-protrusions, +-protrusions, etc., where the given letter or symbol represents the approximate shape of the cross-section of the protrusion extending perpendicular to the axis of the protrusion, i.e. to the connecting line of the free end of the protrusion with the end attached to the lens holder 2. Some of these possible cross-sections are shown in FIGS. 8 and 9. Particularly preferable is a cross-sectional shape of the protrusions comprising a number of straight arms, where at least some of the arms are not parallel with other arms. These arms preferably intersect in the center of the cross-section. The clamping of the arms or similar members on these protrusions may not, in some examples, occur at the perimeter of the gaps defined by the second alignment member 6 as in the drawings but may, for example, occur in the middle of these gaps. The walls clamped in a single cut-out may not have to be parallel but may, for example, form any acute angle, preferably angle smaller than 45°, more preferably smaller than 30°. In FIGS. 8 and 9, all protrusions have a circular base, but in general the base can be of any shape such as square, hexagonal, or the same shape as the rest of the cut-out, i.e., for example, a T-protrusion can have only a T-shaped base, and this T-protrusion can be the entire alignment member 6, and the same applies for other protrusion shapes.

The cross-sections through the protrusion may be reduced in the direction towards the free end of the protrusion, i.e., the thickness and length of the arms may be reduced, the thickness of the arms or only some of the arms may be narrowed, etc. For example, the cross-sections of the arms may lengthen in the direction towards the free end. A single kit may comprise a plurality of differently implemented pairs of complementary alignment members 6, in particular selected from the alternatives and modifications described above and below or combinations thereof.

The kit may not have to comprise the primary optical member 8. The shape of the support element 5, the light source 3, the lens holder 2, or the lens 1 may be any shape other than the one in the shown examples, or the kit may comprise various other parts as well.

The kit can be provided as described in any of the example above, except that the gap-defining alignment member 6 is secured on the lens holder 2 and the alignment member 6 with a protrusion, e.g., a T-protrusion, is secured on the support element 5. Alternatively, the gap-defining alignment member 6 in one pair may be fixed on the support element 5 and in another pair on the lens holder 2 or vice versa.

Figure 6:
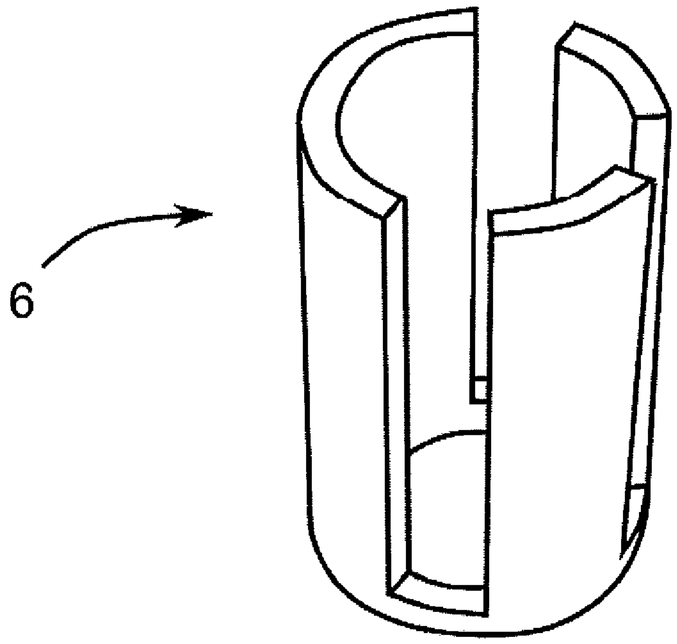
FIG. 6 is a schematic drawing of the alignment member in an example.
Figure 7:
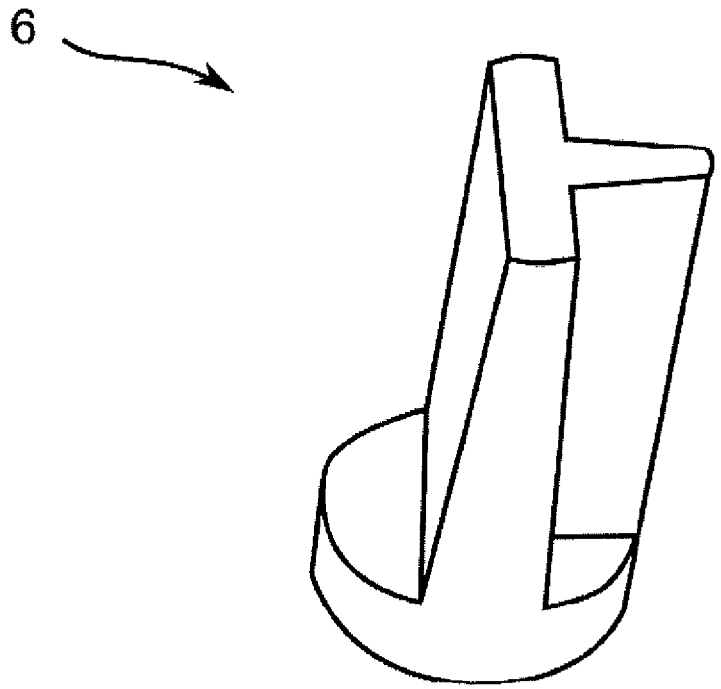
FIG. 7 is a schematic drawing of the alignment member complementary to the member of FIG. 6.

In an example of the kit for lamp module assembly, the gap-defining alignment member 6 in any or each pair of the complementary alignment members 6 is provided such that the gap does not have to (but may) have a narrowing cross-section. Tight seating of the alignment members 6 when one is inserted into the other is provided in this example by the protrusion on the second alignment member 6 narrowing in the direction towards its free end in at least some of its portions. In particular, the thickness of the arms of the protrusion shape, i.e. for example the arms forming a “T”, “*”, “Y”, etc., shape may narrow. An example of such alignment members 6 is shown in FIGS. 6 and 7. As can be seen in FIG. 6, the cut-outs of the gap defined by this alignment member 6 are the same width throughout the entire height. In contrast, the arms of the alignment member 6 of FIG. 7 narrow in the direction towards the free end of this member. It is therefore clear that when the member of FIG. 7 is inserted into the alignment member of FIG. 6, the insertion will take place until the thickness of the arms in the cross-section at the point of entry into the gap exceeds the width of the gap cut-out. At this point, the arms are clamped by the walls of the gap and the parts of the kit are put together in an aligned manner. In various examples, the member of FIG. 6 may be secured on the support element 5, on the lens holder 2, or on both, wherein the complementary member of FIG. 7 is then for a given pair of the complementary alignment members 6 always secured on the other one of these parts. The members of FIGS. 6 and 7 may be modified in various examples, e.g., according to any of the above alternative examples, for example using the cross-sectional shapes of FIGS. 8 and 9. The shapes of FIGS. 8 and 9 can be further adjusted or mutually combined in any example.

Furthermore, the object of the present invention is the support element 5 described above as part of the kit of the invention. This support element 5 is thus adapted to accommodate the complementary first part of the lamp module, comprises at least one alignment member 6, and precisely defines the position of the accommodated parts of the module. The support element 5 or portions thereof, in particular the alignment member 6 or members, may be provided in particular as in any of the example or alternatives described above or as shown in the drawings.

Furthermore, the object of the invention is a lamp module. The lamp module comprises the lens 1, lens holder 2, light source 3, primary optical member 8, support element 5 of the invention, and connecting members 4. All these parts can be implemented in a similar manner to the kit described above, except that the connecting members 4 and/or the support element 5 are adjusted such that the support element 5 is connected to the other parts of the module by connecting members 4 when the module is being assembled. Thus, the fundamental difference between the lamp module of the invention and the kit for lamp module assembly of the invention, and in some example the only difference, is that the support element 5 is a part of the module of the invention, but in the kit of the invention the support element 5 is not a part of the module.

Thus, in the shown example in FIG. 1, it would be sufficient to modify the kit such that the openings for the screws in the handles are smaller in diameter than the heads of the screws and the screws are longer to connect all the parts. However, it is understood that in alternative examples, the support element 5 may be modified such that it does not laterally extend beyond the dimensions of lens holder 2 to make the resulting module more compact due to the assembly in the lamp. In some example, the support element 5 may have a tubular form, such as the lens holder 2 in the drawings, wherein the lens holder 2 then forms an outer cover for the lamp module together with the support element 5, and the heat sink 9 may then, for example, protrude from the open end of the support element 5. Furthermore, it is possible to modify the support element 5 such that it is adapted to be assembled in a larger unit, e.g., provided with screw openings or attachments for assembly in the lamp. In other example, the support element 5 may be adjusted such that the heat sink 9 passes through it when the light source 3 is fitted such that the support element 5 does not restrict access of air to the heat sink 9. In general, the support element 5 may be substantially any element provided with at least one alignment member 6, preferably at least two.

The lamp module of the invention may therefore comprise any of the features or modifications described for the kit for lamp module assembly described above, provided that the nature of those features does not directly preclude it. In particular, it is therefore possible to freely select and/or combine the number and forms of the alignment members 6. In some examples, all the alignment members 6 on the support element 5 are the same so that all the complementary alignment members 6 on the lens holder 2 are also the same. In other examples, however, each alignment member 6 may be different from the others.

The lens holder 2 may be a so-called combined lens holder 2, which is a part that not only ensures that the lens 1 is secured to the rest of the module but also is provided with openings and/or grips for attaching the module to the lamp.

Furthermore, the object of the invention is a method of lamp module assembly. This method is performed with or on the kit of the invention or the lamp module of the invention described above. Specifically, parts comprising lens 1, lens holder 2, light source 3, support element 5, connecting members 4, and primary optical member 8 are used in this method, wherein these parts may be provided, for example, as in any of the above examples or as in any of the figures. In particular, it is essential for the method of lamp module assembly that said parts comprise at least one pair of the complementary alignment members 6, where one member of the pair is fixed on the lens holder 2 and the other on the support element 5. For example, the form of the alignment members is as in the examples above, in particular one alignment member 6 of the pair defines a gap, wherein the other one comprises a protrusion that, when inserted into the gap, is in contact with the gap wall at least at two of its points lying on opposite surfaces of the protrusion. Opposite surfaces are surfaces forming an angle of less than 90°, preferably less than 60°, and more preferably less than 30°. These surfaces may share an edge or have another surface or surfaces between them, or they may also be separated by a gap.

Preferably, each protrusion is in contact with the walls of the gap at least at four different and mutually offset points, or at two pairs of points. The connecting line of the points of one pair is preferably rotated about the axis of the protrusion by at least 20° relative to the connecting line of the points of the second and any other pair, preferably by at least 60° if there are less than four pairs. The securing of the protrusion in the gap is then provided at several places along the perimeter of the protrusion, which increases the stability of securing (and clamping) of the protrusion in the gap and therefore improves the final alignment of the parts, compared to examples where clamping of the protrusion in the gap occurs, for example, on only one side of the protrusion.

For example, the cross-section of the protrusion in the first column of the fourth row in FIG. 9 comprises two arms, and each arm would be clamped by the walls of the gap at two offset and by 90° rotated places—pairs of points. The cross-section in the second column of the third row would be clamped in the complementary gap on each arm, i.e., in eight mutually rotated and offset pairs of points. Preferably, this clamping occurs close to the perimeter of the protrusion, i.e., further from the center, e.g., at least half a radius from the center.

The method of lamp module assembly then comprises the following steps: fitting the light source 3 through the openings 7 on the alignment members 6 on the support element 5 (in the shown example in FIG. 1, in this step the heat sink 9 also fits between the handles of the support element 5); fitting the primary optical member 8 through the openings 7 on the alignment members 6 on the support element 5, preferably on the same alignment members 6 on which the openings 7 of the light source 3 were mounted in the previous step; fitting the lens holder 2 on the support element 5 with the light source 3 and the primary optical member 8, wherein for each pair of the complementary alignment members 6 either the alignment member on the support element 5 which defines the protrusion, fits and is seated on the gap defined by the complementary alignment member on the lens holder 2, or the alignment member on the lens holder 2, which defines the protrusion, fits and is seated on the gap defined by the complementary alignment member on the support element 5 wherein, furthermore, this method comprises a step of: firm connection of the support element 5, the light source 3, the primary optical member 8, and the lens holder 2, e.g., by connecting members 4 such as screws or by pressing or gluing or firm connection of the light source 3, the primary optical member 8, and the lens holder 2, e.g., by connecting members 4 such as screws or by pressing or gluing, wherein the resulting module can subsequently be removed from the support element 5.

The next step of the method is the step of fixing the lens 1 to the lens holder 2, which may occur before, after, or between any two of the above steps.

The above method may be modified at the discretion of one skilled in the art, and in particular may be modified to take into account the various examples of the kit for lamp module assembly described above or the examples of the lamp module or support element 5 of the invention. Conversely, the module, the support element 5, or the kit of the invention may be modified with respect to the method of the invention or to each other. The alternatives and modifications described above can be combined as required.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A kit for a lamp module assembly, the kit comprising:

a first part of the lamp module assembly selected from a set of parts comprising a lens holder, a light source, and a primary optical member; and a support element for the lamp module assembly adapted to precisely accommodate at least the first part of the lamp module assembly, wherein the first part of the lamp module assembly comprises at least one part alignment member and the support element comprises at least one support element alignment member, wherein the part alignment member and the support element alignment member form a pair of complementary alignment members adapted to define a relative position of at least the support element and the first part of the lamp module assembly, wherein one alignment member of each pair of the complementary alignment members comprises a protrusion and other alignment member of each pair of the complementary alignment members comprises a gap with a shape complementary to a shape of the protrusion, the gap being defined by at least one wall, wherein the protrusion is adapted to be seated on the at least one wall of the gap by at least one pair of points lying on two opposite surfaces of the protrusion and comprises two ends, wherein the protrusion is secured to the support element or the first part of the lamp module assembly by a first end and a second end is free and adapted to be inserted into the gap, wherein the gap comprises two ends, a first end being firmly connected to the support element or the first part of the lamp module assembly and a second end defining an entrance to the gap for the protrusion, wherein the protrusion comprises multiple intersecting arms and the gap comprises slots for securing the arms, the slots being located on a perimeter of the gap, wherein the arms narrow in a direction from the first end of the protrusion to the second end and/or the slots widen in the direction from the first end of the gap to the second end, and wherein the support element is further adapted to precisely accommodate a second part of the lamp module assembly, wherein the second part of the lamp module assembly comprises at least one through opening, and wherein the at least one support element alignment member is adapted to pass through the at least one through opening.

2. The kit for lamp module assembly of claim 1, wherein the protrusion is adapted to be seated on the at least one wall of the gap in three pairs of points, and wherein one point from each pair lies on a protrusion surface opposite to a surface on which the other point from the same pair lies.

3. The kit for lamp module assembly of claim 1, wherein the gap is composed of a protruding portion that protrudes from a surface of the support element or the first part of the lamp module assembly, wherein the protruding portion defines the gap.

4. The kit for lamp module assembly of claim 1, wherein the first part of the lamp module assembly is the lens holder, and the light source is the second part of the lamp module assembly comprising the at least one through opening for the at least one support element alignment member to pass through.

5. The kit for lamp module assembly of claim 4, wherein the primary optical member is a further second part of the lamp module assembly and comprises at least one through opening for the at least one support element alignment member to pass through.

6. The kit for lamp module assembly of claim 1, wherein the kit is adapted for removing the set of parts of the lamp module assembly from the support element after the set of parts have been firmly connected together.

7. The kit for lamp module assembly of claim 1, wherein the kit is adapted for attaching the set of parts of the lamp module assembly_to the support element when the set of parts are being firmly connected together.

8. A method of assembling a lamp module based on the kit of claim 1, the method comprising:

providing the first part of the lamp module assembly;

accommodating the first part of the lamp module assembly on the support element, wherein the protrusion of the one alignment member from at least one pair of the complementary alignment members extends into the gap of the other alignment member of the at least one pair of the complementary alignment members and is seated on the at least one wall thereof, wherein the multiple intersecting arms of the protrusion are secured in the slots located on the perimeter of the gap; and firmly connecting the first part of the lamp module assembly to the second part of the lamp module assembly and/or the support element.

9. The method according to claim 8, wherein, before the step of firm connection, the method further comprises:

providing the second part of the lamp module assembly comprising at least one through opening for the at least one support element alignment member to pass through; and accommodating, between the step of accommodation of the first part and the step of firm connection, the second part on the support element with the first part of the lamp module assembly accommodated, wherein at least one alignment member of at least one pair of the complementary alignment members passes through the at least one through opening of the second part of the lamp module assembly.

* * * * *